Feb. 18, 1969  R. C. LANGLEY  3,428,473

SPACE VEHICLE

Filed Aug. 6, 1964

INVENTOR.
Robert C. Langley
BY
*Roger J. Drew*
ATTORNEY

United States Patent Office 3,428,473
Patented Feb. 18, 1969

3,428,473
SPACE VEHICLE
Robert C. Langley, Millington, N.J., assignor to Engelhard Minerals & Chemicals Corporation, a corporation of Delaware
Filed Aug. 6, 1964, Ser. No. 387,888
U.S. Cl. 117—35                                     8 Claims
Int. Cl. C23d 5/10; F24j 3/02; B44d 1/34

ABSTRACT OF THE DISCLOSURE

Space vehicles are provided with superficial discontinuous outer coatings designed to control the temperature and/or reflectivity of the vehicle. Such coatings comprise lead borate which has been pre-reduced to render the coating opaque or, alternatively, nickel or palladium oxide which, under space conditions, are converted to the metallic state and diffuse into the metallic space vehicle surface.

---

This invention relates to plural-function-coated objects and more particularly to objects or articles, for instance space vehicles, provided with plural-function inorganic, thermally refractory, convertible coatings, for instance for controlling the temperature of the environment within the vehicle.

In general, temperature control in space vehicles heretofore has been achieved by the use of coatings on the exterior of the vehicle. Such coatings have been non-convertible in nature, i.e. not convertible to a different composition upon a change in environmental conditions with an attendant change to another useful or desired function. This concept has been called "passive temperature control" and advantages of weight and reliability are intrinsic in this approach in comparison to temperature control by means of circulating heat exchange liquids. Such mechanical means add weight to the vehicle and can be a cause of mission failure particularly when missions of long duration are involved.

It is an object of this invention to provide coatings for space vehicles having the advantages of reliability and minimum weight of prior art passive temperature control coatings but having the added unique advantage of being passive only in a particular range of space conditions and of being predictably changeable or convertible to a different composition and with an attendant change in function as space conditions change.

Heretofore, passive temperature control coating systems have been designed to provide desired conditions within a space vehicle when the vehicle is functioning in a particular narrow range of space conditions, for example, when the vehicle is orbiting at a constant or nearly constant distance from the earth. A knowledge of the space conditions encountered in the particular orbit and a knowledge of the heat generated by devices within the vehicle permit the designer to choose coatings, which are non-convertible under different conditions as stated supra, having particular reflectance and emittance. Coating the exterior of the vehicle with pre-determined areas of such coatings results in a predictable temperature equilibrium during orbit.

Another object of this invention is to provide space vehicles coated in such a manner that predictable temperature conditions can be maintained while the vehicle is in one range of space environment and that the same or predictably different temperature conditions can be maintained while the vehicle is in a greatly different space environment. Such multi-function coatings provide great economy in space missions and permit great versatility in the experimental data obtainable from a single space vehicle. For example, two common missions for space vehicles are the mapping of cloud cover of the earth and the measurement of radiation caused by flares on the sun. The first mission requires an orbit of essentially constant distance from the earth and therefore of essentially constant distance from the sun. The second mission requires that the space vehicle approach the sun either directly or obliquely. The temperature control coatings of the prior art provide the necessary control for either mission but not for both, therefore two space vehicles are necessary for two such missions.

As is described in detail hereinafter, both missions of the above example can be accomplished with a single space vehicle coated with the plural-function convertible coatings of this invention. These coatings will provide a desired temperature range inside the vehicle while at a constant distance from the sun. When this first mission has been completed the vehicle can be directed into a different orbit which will take it closer to the sun and the plural-function coatings will react to the increased radiant flux in such a manner that the temperature range inside the vehicle remains unchanged. The utility of such plural-function coatings is that they permit multi-mission space vehicles thereby realizing large savings in fuel and in booster rockets necessary to achieve orbit. The energy necessary to change the orbit of a vehicle outside the earth's atmosphere is negligible when compared to the energy needed to penetrate the atmosphere from earth.

Coatings on space vehicles are also used for purposes other than temperature control of the vehicle. One such purpose is the conversion of the radiant energy of the sun to heat for use as a power source. In this application it is necessary that the coatings have stable optical properties at elevated temperatures of the order of 500° to 800° C., for extended periods of time. Coatings of this type are described in my co-pending U.S. patent applications Ser. Nos. 269,941 and 314,942.

Organic base coating compositions containing a resin binder have been employed on space vehicles heretofore. While the organic base coatings have been satisfactory for certain uses, such organic coatings are not satisfactory for use at high temperatures above 200° C. encountered in certain outer space missions, inasmuch as the organic coatings are incapable of withstanding such higher temperatures and are adversely affected and will deteriorate upon exposure to these higher temperatures.

It is of importance in the use of man-made space vehicles and earth satellites that the temperature of the environment within the vehicle and surrounding measuring and other instruments carried thereby be controlled within close limits. Thus when the vehicle is carrying electronic instruments, for instance for measuring cosmic activity, solar flares, etc., or is equipped with a television camera for taking pictures of weather conditions, cloud cover, hurricanes, etc., it is important for optimum operation thereof that the temperature be maintained within close limits. As illustrative, a constant or substantially constant temperature of the environment within the vehicle or satellite of 30°–35° C. ±5° C. has been desired heretofore in vehicles orbiting the earth and carrying electronic instruments for observing and transmitting to earth information regarding cloud cover and weather conditions to avoid their overheating and failing or excessive fluctuating of the instruments.

The plural-function coated object or article of the present invention, in its broader aspects, comprises the article, for instance a space vehicle or satellite, and forming at least a portion of the exposed surface of the vehicle a thin plural-function, inorganic, thermally refractory, convertible coating of a glassy material which is hereinafter defined. The plural-function coating is characterized by being convertible to a different composition when subjected to a change of environmental or other conditions with an attendant change in function of such coating. The thin, inroganic, refractory convertible coating of glassy material of this invention is characterized by being capable of withstanding high temperatures above 200° C. and as high as 800° C. and even slightly higher without their deterioration or deleterious effect thereto.

In accordance with one embodiment of the invention, it has been found that the temperature of the environment within the space vehicle or satellite carrying electronic instruments is readily and effectively controlled within the desired close limits by providing as an exposed surface of the vehicle a thin, plural-function, convertible discontinuous coating, for instance as spaced apart stripes, of a glassy material which is opaque, i.e., a substantially non-transmitter of visible light, in the reduced state and a transmitter of solar radiant energy in the oxidized state. The surface of the vehicle exposed at the discontinuities, i.e., areas of the surface not covered by the spaced apart stripes or other discontinuous coating, is of a material, for instance gold, which is reflective to solar radiant energy including visible light at the discontinuities. Beneath the discontinuous coating is either a reflector of solar radiant energy including visible light, or an absorber of infrared energy depending on the particular result or purpose desired as hereinafter disclosed and also the particular point in the journey of the vehicle or satellite also as hereinafter disclosed. By varying the ratio of absorptive to reflective surface of the vehicle during the application of the spaced apart stripes or other discontinuous coating in accordance with the amount of heat emitted by the instrument or instruments within the vehicle during their operation, the temperature of the environment surrounding the instruments within the vehicle is controlled within close limits.

In another embodiment of the invention, the discontinuous coating of glassy material is infrared energy-absorptive in the reduced state and solar energy-transmissive in the oxidized state, with the vehicle surface at the discontinuities light reflective and the vehicle surface beneath the coating light reflective when exposed to light. The vehicle is launched and journeys or orbits outside the earth's atmosphere with the discontinuous coating normally in a reduced state wherein it is infrared energy-absorptive and heats up, the heat being transferred through the metallic skin of the vehicle by conduction and emitted therein. After the passage of a substantial time, the vehicle or satellite will commence losing altitude until ultimately journeying into the earth's upper atmosphere. After a period in the earth's oxidizing atmosphere of typically 30 minutes or thereabouts, oxidation of the coating of the stripes or other discontinuous coating occurs with the result the stripes also become transmissive to solar radiant energy including visible light. By reason of the reflective surface beneath the stripes, the entire surface of the vehicle becomes light reflective whereby the orbiting vehicle or satellite becomes a "moon" and can be tracked optically. The orbiting moon has a high degree of utility as a navigation aid for ships at sea, submarines, etc.

The coating is preferably applied onto metallic panels or "shingles" which are secured in or to the vehicle surface in such fashion that the coating forms the discontinuous coating, for instance the stripes. The panels have a light reflective surface beneath the discontinuous coating, for instance a thin coating of gold or silver.

Exemplary of coating materials for forming the discontinuous coating of the embodiment disclosed supra are a composition containing, by weight, 2 parts of lead borate, i.e., $Pb(BO_2)_2 \cdot H_2O$, and 1 part of bismuth subnitrate, i.e., $4BiNO_3(OH)_2 \cdot BiO(OH)$, slurried in water to a typical weight ratio of 1:1 of water to the composition respectively. The slurry is applied to the metallic "shingles" or, if the vehicle is of sufficiently small size to enable firing of the applied coating in a conventional size firing oven, directly over the vehicle skin by brushing or other suitable method, followed by firing the thus-coated article in air at a temperature of about 600° C.–700° C. to effect adherence of the coating to the substrate, and then heating the coated article at a temperature of about 360° C.–500° C. in the presence of a reducing gas, for instance $H_2$, so that the coating becomes opaque and a non-transmitter of light. This coating is applied relatively thick by the brushing and appreciably thicker than the particular radiant energy wave length so that there is no quarter wave length optical interference in this embodiment when the coating is in oxidized state. This coating becomes transmissive at temperature of typically 600° C. in the presence of $O_2$ due to oxidation. Another material utilizable herein for forming the discontinuous coating of glassy material of this embodiment is lead borate slurried in water in the weight ratio of water to lead borate of typically 1. This composition is applied by brushing on the metallic panels or "shingles" or it may be applied directly onto the outer surface of the vehicle as disclosed previously herein, followed by heating the coated "shingles" or vehicle in air at a temperature of about 600° C.–700° C. to effect adherence of the coating to the substrate, and then heating in the presence of a reducing gas, for instance $H_2$. The resulting coating is opaque and comprises metallic lead dispersed substantially uniformly in primarily lead borate containing a minor amount of lead sub-borate.

In another embodiment, the discontinuous coating is solar radiant energy-transmissive in the oxidized state and is coated over a normally light reflective metal, for instance gold, forming the outer surface of the vehicle. Examplary of the material of the discontinuous coating of this embodiment is PdO or NiO in the oxidized state and Pd or Ni respectively in the reduced state, such coating being applied as is hereinafter described. However, in this embodiment, the thickness of the discontinuous coating is controlled to be of the order of one-fourth the value of the particular radiant energy wavelength at which increased absorption is desired. Consequently, by reason of the principle of quarter wavelength optical interference, the normally light reflective surface therebeneath functions as an infrared energy-absorptive surface and heats up, the heat being transferred by conduction through the metallic layer of the vehicle and emitted into the atmosphere therewithin. In the reduced state the discontinuous coating diffuses into the infrared energy-absorbing surface to form a single layer or coating having again a light reflective surface. The vehicle surface at the discontinuities is also light reflective. In this embodiment the vehicle is launched with the discontinuous coating in the oxidized, transmissive state and journeys outside the earth's atmosphere in this state. However, upon approaching the sun, the discontinuous coating becomes reduced at a distance from the sun corresponding to a predetermined elevated temperature in the high vacuum, whereby it diffuses into the infrared energy-absorbing surface layer of the vehicle to convert such surface into a reflective surface. The desired temperature is thus maintained within the vehicle and heat deterioration or damage to the instruments is thereby avoided.

In a modification of this embodiment, spaced apart stripes are employed with certain of the stripes, preferably alternate stripes being of a glassy material that "kicks off," i.e. the metal oxide thereof becomes reduced and diffuses into the energy-absorptive layer therebeneath, at a relatively farther distance from the sun corresponding to a predetermined lower temperature, and the remaining stripes of a glassy material that "kicks off," i.e. the metal oxide thereof becomes reduced and diffuses into the energy-absorptive layer therebeneath, at a closer distance to the sun corresponding to a predetermined higher temperature. Exemplary of such coatings are PdO for the coating that becomes reduced at the lower temperature farther from the sun, the PdO decomposing to Pd and $O_2$ at temperature of about 450° C. and a high partial vacuum of $0.5 \times 10^{-5}$ torr or higher, and NiO for the coating that becomes reduced at the higher temperature closer to the sun, the NiO decomposing to $Ni + O_2$ at temperature of about 550° C. at a high partial vacuum of 0.5×10⁻⁵ torr or higher. Consequently, as the vehicle approaches the sun, the PdO stripes "kick off" first and a single layer is formed by the diffusion of the material of the stripes into the infrared energy-absorbing layer of the vehicle to convert such surface to a reflective surface. While there is less infrared energy being absorbed at the vehicle surface due to the one set of PdO stripes "kicking off," the temperature within the vehicle is nevertheless maintained within the desired close limits due to their being considerably more solar radiant energy contacting the vehicle surface due to the vehicle's closer proximity to the sun. As the vehicle journeys still closer to the sun, the remaining set of NiO stripes "kick off" at a distance from the sun corresponding to a temperature of about 550° C. Now there are no stripes effecting the absorption of infrared energy but the temperature of the environment surrounding the instruments within the vehicle is still maintained within the desired close limits for a substantial time due to the greater radiant energy contacting the vehicle surface, and until the vehicle approaches the sun so closely that the temperature therewithin becomes excessively high and the vehicle is ultimately destroyed due to the great heat.

The discontinuous coating of PdO of the last-mentioned embodiment is applied onto the metallic "shingles" or panels or it may be applied directly onto the outer surface of the vehicle as a solution in an organic solvent of an organo compound, for instance a resinate of palladium. The soluble resinate of palladium is prepared by reacting a palladium salt, such as palladium chloride, with a sulfurized terpene, such as sulfurized venetian turpentine, by mixing at moderately elevated temperature of about 75° C.–100° C. Suitable solvents for preparing such composition are a mixture of essential oils; oil of turpentine; and a mixture of oil of rosemary, nitrobenzene and toluene. Application is by spraying or brushing. The applied solution is then fired in air at a temperature of typically about 600° C. to decompose the palladium resinate, drive off the organic matter and deposit on the surface of the "shingles" or vehicle a thin coating of PdO. An example of a suitable palladium resinate composition for application to form the discontinuous coating follows:

COMPOSITION I

| | Percent by weight |
|---|---|
| Palladium resinate dissolved in a mixture of oil of rosemary, nitrobenzene and chloroform (2% PdO) | 50 |
| Rosin dissolved in oil of spike (50% rosin) | 11 |
| Oil of lavender | 13 |
| Oil of camphor | 13 |
| Oil of petitgrain | 13 |

The discontinuous coating of NiO of the last-mentioned embodiment is applied onto the metallic "shingles" or panels or it may be applied directly onto the outer surface of the vehicle as a solution in an organic solvent of an organo compound, for instance a resinate of nickel. The soluble resinate of nickel is prepared by reacting nickel acetate with rosin at temperatures of 75° C.–150° C. The solvents utilized for preparing such composition include those previously disclosed herein for the preparation of the palladium resinate solution. Application is by spraying or brushing. The applied solution is then fired in air at a temperature of about 500° C.–800° C. to effect decomposition of the nickel resinate, drive off the organic material and deposit a thin coating of NiO on the "shingles" or vehicle surface. An example of a suitable nickel resinate composition for application to form the discontinuous coating follows:

COMPOSITION II

| | Percent by weight |
|---|---|
| Nickel resinate dissolved in a mixture of oil of rosemary, nitrobenzene and toluene (6% NiO) | 60 |
| Rosin dissolved in pine oil (40% rosin) | 15 |
| Oil of camphor | 15 |
| Chloroform | 10 |

In still another embodiment of the invention, the discontinuous coating, for instance the spaced stripes, of glassy material is solar radiant energy-transmissive in the oxidized state and is coated in such state over either a light reflective or non-reflective surface forming the outer surface of the space vehicle. Exemplary of the coating in this embodiment is PdO·SiO₂. During the journey of the vehicle to the vicinity of the sun, the coating remains transparent or substantially transparent in the high vacuum of outer space of 0.5×10⁻⁵ torr or higher to a predetermined elevated temperature, for instance to about 800°–900° C. with the PdO·SiO₂. At such temperature the coating becomes reduced and converts to the opaque, non-transmissive form with the PdO·SiO₂ being converted to Pd·SiO₂. This opaque form of the coating is an adsorber of infrared energy with the coating heating up with the adsorption of such energy, and not diffusing into a metallic substrate. This embodiment has utility for certain space temperature control applications where it is necessary that a vehicle having a highly emitting surface be available. Inasmuch as the absorbing coating is a good heat emitting surface, the discontinuous coating or film functions as a heat sink for lowering the equilibrium temperature of the vehicle after an elevated temperature, for instance of about 800°–900° C. is attained. As heat increases within the space vehicle, it is transferred to the Pd·SiO₂ emitting surface by conduction, and emitted from the Pd·SiO₂ by radiation into space. The discontinuous coating of this last-mentioned embodiment is applied as a solution in an organic solvent, for instance a mixture of essential oils; oil of turpentine; or a mixture of oil of rosemary, nitrobenzene and toluene of a resinate of palladium and a resinate of silicon with the composition being so proportioned that equimolar amounts of Pd and SiO₂ are present in the product fired coating in the reduced state. The soluble resinate of silicon is prepared by heating at 120° C.–130° C. a mixture including silicon tetrachloride and pine rosin as disclosed in U.S. Patent 2,842,457, column 7 thereof. The soluble resinate of palladium is prepared as hereinbefore described. This composition is applied by brushing or spraying onto the metallic "shingles" or it may be applied onto the outer surface of the space vehicle as previously disclosed herein, followed by firing in air at a temperature of about 550° C. to decompose the palladium resinate and to form a liquid fusion melt of the metal oxide constituent thereby to obtain after cooling, a coating of a glassy material comprising PdO·SiO₂. In this condition the coating transmits about 90% of light, is light amber in color and is not electrically conductive.

The discontinuous coating of this invention of the glassy material may cover from about 30%–70% of the area of the outer surface of the vehicle or satellite, depending on the quantity of heat being emitted from the instrument or instruments within the vehicle, with the remainder of the exposed surface being light reflective. Thus with one or more instruments within the vehicle emitting relatively larger quantities of heat the stripes or other discontinuous coating will typically cover about 45%–50% of the vehicle outer surface with the remainder the light reflective surface, while with one or more instruments within the vehicle emitting an appreciably smaller amount of heat, the discontinuous coating will typically cover about 50%–55% of the vehicle outer surface with the remainder the reflective surface.

Alternatively, the discontinuous coating of this invention can be in the form of spaced apart circular or triangular areas, or broken "dash-type" lines, etc. instead of the spaced stripes.

By the term "glassy material" used herein with regard to the thin, plural function, inorganic, thermally refractory convertible coating of this invention is meant a fused, non-crystalline, amorphous solid brittle mass or material formed by cooling a liquid fusion melt, and technically considered to be a glass, and being transparent or translucent to visible light with a metal constituent thereof in an oxidized state but opaque and non-transmissive to visible light with the metal constituent in the reduced state, exemplified by the $PdO \cdot SiO_2$ herein; and also a non-crystalline, amorphous solid mass or material not technically considered a glass in the strict sense but in the thin, plural function, inorganic, convertible coating of this invention being closely similar to a glass in certain respects, viz. by being transparent or translucent and transmissive to visible light when the metal constituent thereof is in an oxidized state but opaque and non-transmissive to visible light with the metal constituent in a reduced state, exemplified by the PdO and NiO coatings herein.

Reference is now made to the accompanying drawings wherein.

Figure 1:
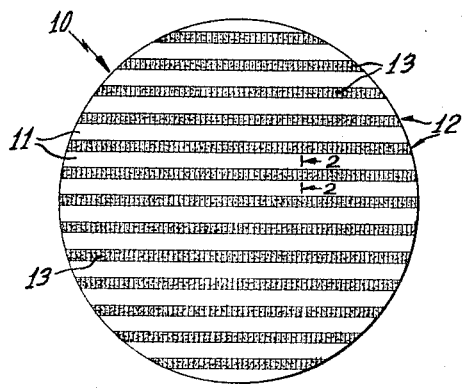
FIGURE 1 is a diagrammatic representation of a space vehicle of the present invention.
Figure 2:
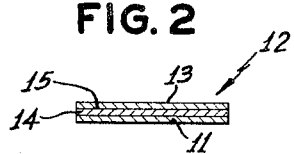
FIGURE 2 is an enlarged transverse sectional view taken on line 2–2 of FIGURE 1.

With reference to FIGURE 1, space vehicle 10 has a reflective aluminum skin or layer 11 secured onto a suitable frame (not shown). Alternatively, layer 11 can be of copper or of other suitable reflective metal or material known to the art. Vehicle 10 is of spherical or substantially spherical configuration as shown, but it is to be understood the vehicle may be of a different and non-spherical shape, for instance cylindrical or substantially cylindrical or of other shape. Spaced apart stripes 12 comprise an infrared energy-absorptive thin coating 13 of typical thickness of 1000 A., of a glassy material obtained by firing in air at a temperature of about 500° C.–600° C. an applied composition comprising, by weight, 2 parts of the lead borate and 1 part of the bismuth subnitrate, slurried in water in a typical weight ratio of 1:1 of water to the composition respectively, for a period sufficient to effect fusion of the glass and adherence to the substrate, followed by heating the thus-fired applied coating at a temperature of about 360° C. in the presence of $H_2$ for a period sufficient to effect reduction of sufficient Pd and Bi to render the coating opaque. Coating 13 is deposited and adhered on reflective aluminum panels or "shingles" 14, shown in FIGURE 2, of typical size of about 4″ in length, 8″ in width and 30 mils thickness. "Shingles" 14 have a light-reflective surface 15 of either the aluminum or a thin electroplated or otherwise applied layer of Au, Ag or Cu. Stripes 12 constitute approximately 50% of the area of the exposed surface of the vehicle. "Shingles" 14 are secured to layer 11 by means of bolts 16 (not shown). Vehicle 10 is launched into orbit outside the earth's atmosphere by means of a rocket in well-known manner, and by reason of coating 13 of stripes 12 absorbing infrared energy and skin 11 of the vehicle reflecting solar radiant energy, the temperature of the environment within the orbiting vehicle is maintained at the desired constant or substantially constant temperature non-detrimental to the instrument or instruments carried by the vehicle 10. Consequently the instruments are not overheated and their failing or excessive fluctuating is avoided. Antenna (not shown) carried by vehicle 10 for transmitting information back to earth is retained within the vehicle until in orbit, when the antenna moves out to project outward from the vehicle in well known fashion. Vehicle 10 also has a port or window (not shown) for enabling the television camera, when carried, to take pictures.

When vehicle 10 ultimately loses altitude and again enters the earth's atmosphere, oxidation of coating 13 of stripes 12 occurs with the result coating 13 is converted from being absorptive to solar energy-transmissive. With the light-reflective surface 15 of shingles 14 thereunder, the substantial entirety of the exposed surface of vehicle 10 becomes light reflective and the vehicle then functions as a "moon" and can be optically tracked. Since orbits even in the upper atmosphere are necessarily of short duration due to the braking effect caused by atmospheric friction, it may be desirable to return the satellite to orbit outside the atmosphere after oxidation of the coating. This can be done simply and inexpensively by triggering a small rocket contained in the vehicle. Such triggering can be accomplished by radio signal from earth or by an appropriate sensing device within the space vehicle. The net result is a multi-function space vehicle, which having completed an active mission of making measurements and transmitting data is changed to an entirely different, passive function. Space vehicle 10, excepting the stripes 12 in accordance with this invention, is a conventional space vehicle the construction of which is well known to the art.

Figure 3:
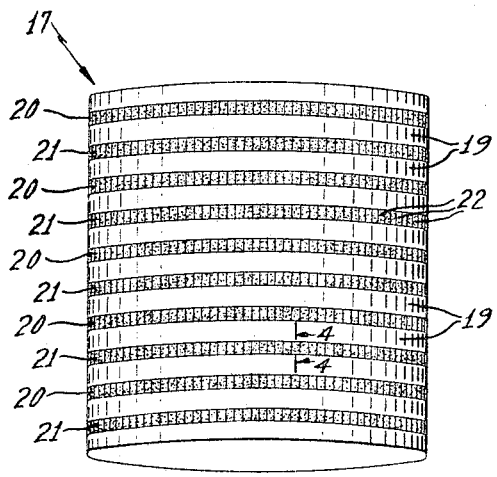
FIGURE 3 is a diagrammatic representation of another space vehicle of this invention.
Figure 4:
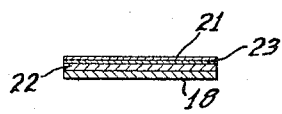
FIGURE 4 is an enlarged transverse sectional view taken on line 4–4 of FIGURE 3.

Referring to FIGURE 3, space vehicle 17 has aluminum layer 18, shown in FIGURE 4, secured onto a suitable frame (not shown) with a thin coating 19 of gold over the aluminum at the discontinuities between stripes 20 and 21 hereinafter referred to. Alternatively a thin coating of Ag or Cu can be utilized in place of Au for coating 19. Gold coating 19 is of typical thickness of 10 microns, and is applied onto the surface of the aluminum by electroplating or other suitable method. Vehicle 17 is of cylindrical shape but may be of spherical or another shape. Spaced apart stripes 20 of PdO of thickness preferably in the range between 0.1 micron and 0.4 micron inclusive alternate with stripes 21 of NiO also of thickness preferably in such range, as a major portion of the sun's radiant energy is emitted at wavelengths of between 0.4 and 1.5 microns. Stripes 20 and 21 constitute about 50% of the area of the exposed surface of the vehicle. Stripes 20 and 21 are applied onto aluminum "shingles" or panels 22 of typical dimensions of length of 4″, width of 12″ and thickness of 30 mils, "shingles" 22 having a thin coating 23 of gold, shown in FIGURE 4, over which the stripes are applied. By the mechanism of quarter wavelength optical interference, the exposed coating of PdO and NiO of respectively stripes 20 and 21 in combination with the layer of gold therebeneath functions as a solar collector with the gold layer absorbing a major portion of the infrared energy. "Shingles" 22 are arranged on aluminum layer 18, shown in FIGURE 4, in such fashion as to form stripes 20 and 21 and are secured to layer 18 by bolts (not shown). With the exception of the stripes 20 and 21 of the present invention, space vehicle 17 is a conventional vehicle the construction of which is well known to the art. Vehicle 17 is also equipped with an antenna (not shown) for transmitting data and information back to earth, and may also be equipped with one or more jet nozzles (not shown) for changing direction, etc.

Vehicle 17 is launched with the coating of stripes 20 and 21 in oxidized and hence transmissive state. Gold coating 19 beneath stripes 20 and 21 absorbs most of the solar infrared energy striking stripes 20 and 21 during the journey of the vehicle and heats up. However, coating 19 of gold between stripes 20 and 21 serves to reflect most of the solar radiant energy impinging thereon. With heat being transferred by conduction from gold coating 23 beneath stripes 20 and 21 through metallic shingles 22 and layer 18 and emitted into the atmosphere within the vehicle and radiant energy being reflected away from the vehicle by exposed gold coating 19, the desired equilibrium temperature is maintained within the vehicle whereby heat deterioration and damage to the instruments therewithin is avoided. Further, excessive fluctuation of the instruments in their measurements, etc. due to excessive heat is also eliminated.

As vehicle 17 journeys closer to the sun, at a certain distance from the sun corresponding to a temperature of about 450° C., the PdO of stripes 20 will undergo reduction to Pd and $O_2$, the $O_2$ being lost to the vacuum of space, and the Pd diffusing into the energy-absorbing gold layer 19 to form a single reflective layer. However, even though there is a considerable reduction in the energy-absorbing means due to stripes 20 "kicking off" because there is considerably more solar radiant energy contacting the surface of the vehicle due to its closer location to the sun, the temperature within the vehicle is maintained at the desired equilibrium temperature. Now as the vehicle journeys still closer to the sun, the remaining energy-absorbing stripes 21 "kick off" at a distance from the sun corresponding to a temperature of about 500° C., with the NiO being reduced to Ni+$O_2$ and the Ni diffusing into the gold layer therebeneath to form a reflective single layer. At this stage no stripes are present to effect absorption of the infrared energy. However the temperature within the vehicle is still maintained within the desired close limits for some time and until the vehicle approaches the sun too closely, whereat the temperature therewithin will rise excessively and the vehicle is ultimately destroyed by the great heat.

While the invention has been described previously herein as applicable for controlling the temperature within space vheicles, the invention is also applicable for changing the optical properties of an orbiting space vehicle upon command. For example, an orbiting vehicle having a highly reflective gold surface completely covered by a transparent PdO surface of appropriate quarter wavelength thickness will absorb sufficient solar radiant energy to function as a non-reflective object. This will make the orbiting vehicle invisible for optical tracking. Upon command from earth, heat from a source within the vehicle is applied to the PdO coating to change it to Pd and $O_2$, thus changing an absorbing surface to a highly reflective surface, visible for optical tracking.

The following examples further illustrate the invention:

Example I

The following composition was formulated by mixing together the following ingredients, and applied by brushing to a flat glass plate as a film of 0.1 mil thickness:

| | Parts by weight |
|---|---|
| Lead borate | 20 |
| Bismuth subnitrate | 10 |
| Water | 30 |

After firing in air to 600° C., a clear, completely transparent, light transmissive film of a glass or glassy material resulted. This was heated in hydrogen at 360° C. for 44 minutes and the color of the glass changed to dark brown wherein it absorbed about 90% of infrared energy and transmitted only about 10% of visible light. The film also then had low electrical conductivity, indicating the presence of metallic Pb and/or Bi. When heated at 300° C. in air for one hour, there was no change. After 30 minutes at 500° C. in air, again no change, but after 30 minutes at 600° C. in air, the film was again a clear, completely transparent, colorless glass.

Example II

A palladium resinate-containing composition designated Composition I, which is previously disclosed herein, was brushed onto a flat glass plate as a film of 0.1 micron thickness, and fired gradually in air to 570°C. with a 20 minute soak at peak temperature. The film was amber in color and transmitted about 60–70% of visible light. After firing to 250°C. in hydrogen for 15 minutes, the film changed to a bright, metallic film having high reflection and very little transmission of visible light. When again heated in air on the original cycle, the film reverted to the amber, transmissive state.

Example III

A space vehicle orbiting the earth and having a highly reflective surface is useful for navigation of ships and aircraft. When the vehicle is in stable orbit and when the orbit is known, the reflective surface permits optical tracking and simple yet very accurate navigation. For certain military purposes, it may be advantageous to launch such vehicles into stable orbits while maintaining the vehicle surface in non-reflective form thus preventing optical tracking and navigation by this means. At an appropriate time, e.g. the beginning of a major military campaign, the surface can be changed on radio command from earth from non-reflective to reflective, by application of heat thereto from a source within the vehicle, thus aiding navigation only for those having prior knowledge of the orbit.

The exterior surface of a space vehicle has a skin of highly polished titanium. This is coated completely with a pure gold film of 0.5 mil thickness. Over the gold film a transparent film of PdO is applied using the solution and firing technique (570° C. in air) described in Example II supra. The thickness of the PdO film is carefully controlled at 1250 Angstroms, thus rendering it an antireflection coating for that wavelength where solar radiation peaks (5000 Angstroms) by quarter wavelength optical interference. Because of the decreased reflection of sunlight obtained with this coating system, the orbiting space vehicle is rendered invisible to the unaided eye.

When it is desired that the space vehicle become visible, this can be achieved by a timing device contained in the vehicle or by a radio command from earth. Either signal triggers an exothermic reaction which raises the skin temperature of the space vehicle to a temperature of approximately 600° C., sufficient to decompose the PdO film to Pd and $O_2$ and to effect diffusion of the resultant thin Pd film into the relatively thick gold film. This temporary rise in surface temperature of the space vehicle can be achieved by many exothermic reactions, such as the oxidation of sugar by potassium nitrate. The net result is that an orbiting space vehicle having low reflectivity of sunlight is changed on command to an excellent reflector of sunlight.

Example IV

A solution suitable for spraying was prepared by mixing together the following:

| | Percent by weight |
|---|---|
| Silicon alcoholate dissolved in a mixture of essential oils and chloroform (20% $SiO_2$) | 1.5 |
| Oil of peppermint | 43.5 |
| Rosin dissolved in oil of pine (40% rosin) | 5.0 |
| Palladium sulforesinate dissolved in oil of lavender, nitrobenzene and chloroform (9% Pd) | 50.00 |

The resultant fluid solution contained 4.5% Pd and 0.3% $SiO_2$. When sprayed on a flat glass plate and fired in air at 570°C. with a 20 minute soak at peak temperature, whereby a liquid fusion melt of PdO and $SiO_2$ was obtained, followed by cooling of the melt, a transparent glassy orange film resulted. This transmitted about 70% of visible light. After heating in hydrogen at 250° C. for 15 minutes, the film changed to a dark, almost black film which transmitted only about 10% of visible light.

What is claimed is:

1. A space vehicle comprising the vehicle and forming a portion of the exposed surface thereof a thin, opaque, inorganic thermally refractory discontinuous coating of a glassy material prepared by coating a portion of the exposed surface with a coating material comprising lead borate, heating said coated curface to a temperature between about 600° to 700° C. in air to effect adherence of the coating material to the substrate and then heating said coated surface in the presence of a reducing gas to a temperature between about 360° C. and 500° C. to render said coating opaque, the exposed surface of the vehicle at the discontinuities and the vehicle surface beneath the coating being light reflective.

2. The space vehicle of claim 1 wherein the coating material comprises a mixture of lead borate and bismuth subnitrate.

3. The vehicle of claim 1 wherein the coating covers between about 45% and 55% of the area of the outer surface of the vehicle, the remainder of the vehicle outer surface being light reflective.

4. The vehicle of claim 1 wherein the light-reflective exposed surface at the discontinuities is of gold.

5. A space vehicle comprising the vehicle, a thin coating of a normally light-reflective metal forming the outer surface of the vehicle and a discontinuous coating of palladium oxide or nickel oxide over the light reflective metal coating, said discontinuous coating being of thickness of the order of one-fourth the solar radiant energy wave-length at which increased absorption thereof is desired, the oxide coating being reduced to the metallic state at the elevated temperatures and high vacuum of space whereby the oxide is converted to metallic palladium or nickel which diffuses into the light-reflective metal to convert such surface to a reflective surface.

6. The vehicle of claim 5 wherein the discontinuous coating is of thickness between 0.1 micron and about 0.4 micron.

7. The vehicle of claim 5 wherein the normally light-reflective metal is gold.

8. The vehicle of claim 5 wherein the normally light-reflective metal is silver.

References Cited

UNITED STATES PATENTS

| | | | |
|---|---|---|---|
| 1,966,059 | 7/1934 | Chiera | 117—33.3 X |
| 2,710,274 | 6/1955 | Kuehl | 117—33.3 |
| 3,174,537 | 3/1965 | Meyer | 117—33.3 X |
| 3,269,847 | 8/1966 | Cohen | 252—300 |

FOREIGN PATENTS 1,063,773   8/1959   Germany.

RALPH S. KENDALL, *Primary Examiner.*

U.S. Cl. X.R.

117—40, 45, 70; 244—1, 117; 165—30